Patented Apr. 15, 1930

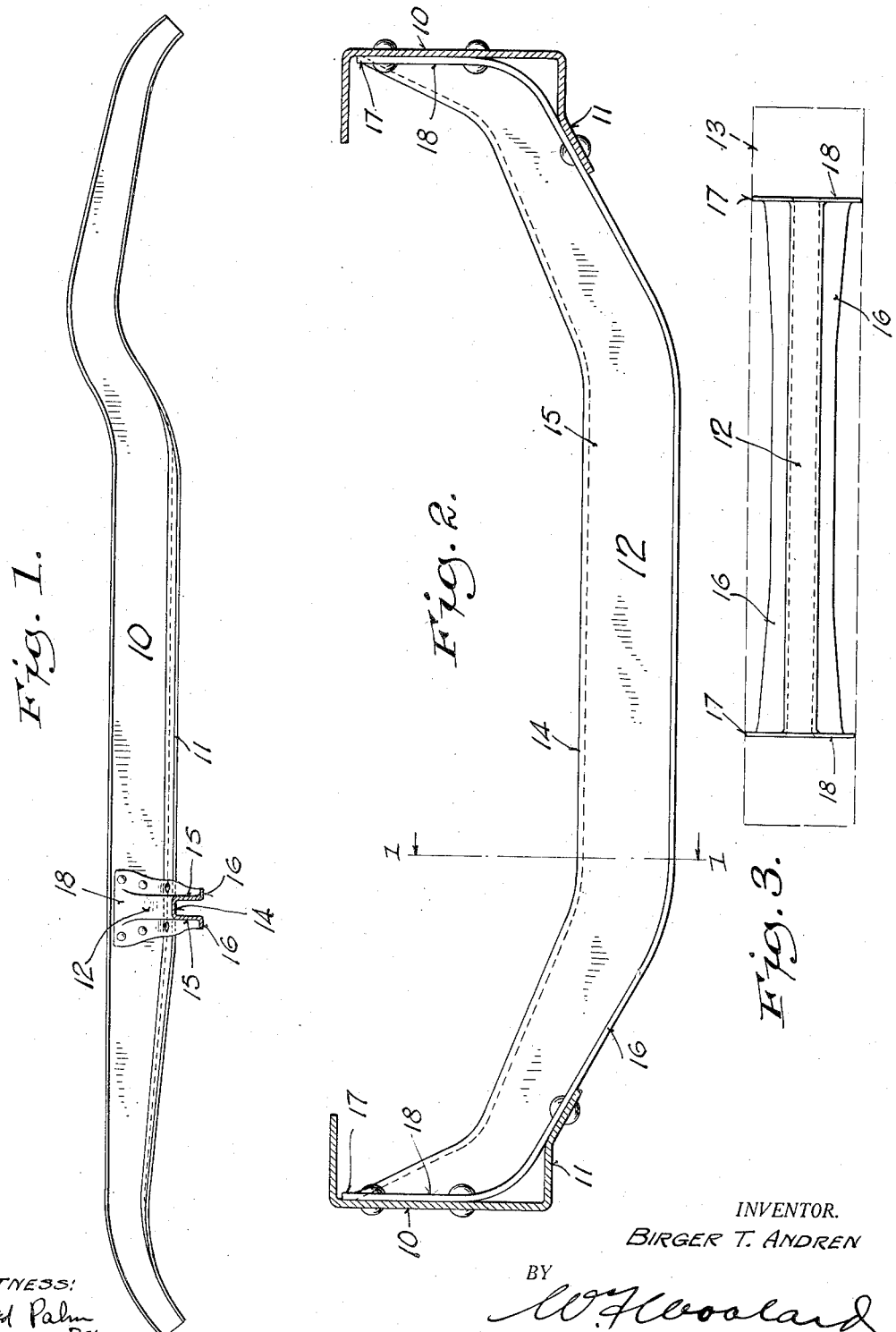

1,754,927

UNITED STATES PATENT OFFICE

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK

AUTOMOBILE FRAME

Application filed February 2, 1928. Serial No. 251,275.

My invention relates to an improved construction of frame or chassis for automobiles or other vehicles, and comprises a novel construction of side bars and cross bars, and the combination of the parts, whereby the connection between the side bars and the ends of the cross bars is greatly improved, thus producing an increased stability of the frame.

The frame constitutes the base upon which the sprung weight of the automobile is carried, and certain structural conditions require that the said frame be maintained at a predetermined elevation with relation to the running gear of the automobile. It is desirable, however, that the center of gravity, particularly of the engine, be as low as possible, and to effect this result, the supports for the engine, which is supported by the frame, should be arranged in a plane below that of the frame. The accomplishment of this arrangement has presented some serious engineering problems, which have not always been overcome satisfactorily, in many of the automobiles of today. Depending cross bars have been arranged to extend into a plane below that of the frame, but with such cross bars it has been difficult to make an entirely satisfactory connection between the ends thereof and the side bars of the frame.

My present invention provides a solution of the problem, and I have produced a construction of frame in which both the side bars and the cross bars involve novel features. The manner of connecting the ends of the cross bars to the side bars in the combination is also novel. As a result, I have produced a frame possessing more than the usual degree of rigidity in the connection between the ends of the cross bars and the side bars, and at the same time have preserved in the frame so constructed, the necessary flexibility to enable it to function properly, when road obstructions are encountered by the automobile in which the frame is incorporated as a part.

In forming my improved cross bar, I use a rectangular strip of sheet metal, but do not subject it to the usual blanking operation to produce a contoured blank, and so avoid any waste by producing scrap. I draw this strip into the form of an inverted channel member, curved downwardly between its ends, the closed bottom or web of the channel being at the upper side, with parallel vertical side walls depending from the web and varying in height at sections in the length of the cross bar, and produce a flange extending outwardly from the lower edge of each side wall, for the full length of the cross bar. Inasmuch as the channel is of uniform width, and the side walls thereof vary in height, the flanges vary in width accordingly, being narrow in those sections where the height of the side walls of the cross bar is greatest, and wide in those portions of the cross bar where the height of the side walls is least. The transverse linear dimension of the cross bar is therefore the same on every cross sectional line. The ends of the cross bar are upturned, so that at the ends of the cross bar, the flanges stand in parallel vertical planes.

The lower flanges are continuous from one end of the cross bar to the other, and gradually merge from a horizontal plane at the middle or central section of the cross bar into the vertical planes at the ends thereof. This novel construction at the ends of the cross bar permits the flanges at the under side and ends of the cross bar to be advantageously connected to both the vertical web and to the lower flange of the side bars.

To enable the connection desired to be effected in a more efficient manner, I have changed the form of the lower flange of the side bar, increasing the width thereof laterally over that of the upper flange, and have bent the outer margin of the lower flange at an angle, so as to provide the lower flange with a downwardly extending portion, which will lie in the plane of the flanges of the cross bar at the points of engagement of the parts.

The widened flanges at the ends of the cross bar act as gussets to permit attachment of such ends to the side bars at points separated a considerable distance from each other in the direction of the length of the frame, and the result of this feature of construction is that the frame is effectively braced against longitudinal racking.

Having thus outlined the nature of the invention, I will now describe the same specifically, and point out the novelty thereof in the appended claims.

In the accompanying drawing:

Figure 1 is a view in elevation of the inner side of a side bar embodying my improvement, and showing the manner of connecting the cross bar thereto, the formation of the inverted channel cross bar being shown in transverse vertical section, on the line 1—1, Fig. 2.

Fig. 2 is an enlarged view showing in side elevation a cross bar constructed in accordance with my invention, and showing in transverse section the side bars of the frame, the view showing also the manner of the connection existing between the parts.

Fig. 3 is a diagrammatic view illustrating in broken lines the rectangular blank from which the cross bar is drawn, and in full lines in a plan view a completed cross bar.

In the drawing the numerals 10, 10, indicate the longitudinal side bars of an automobile or other vehicle frame, such side bars being drawn from sheet steel, so as to provide channels having vertically standing webs, with upper and lower laterally extending flanges, all as usual. The width of the lower flange, which I have indicated by the numeral 11, is increased somewhat over that of the upper flange, and the outer margin of the said lower flange is bent downwardly so as to stand at an angle, as shown in Fig. 2, for a purpose which hereinafter will be described.

The cross bar 12 is drawn from a rectangular strip 13 of sheet metal, conventionally illustrated by broken lines in Fig. 3. In drawing the cross bar, the rectangular sheet is converted into an inverted channel with the central web 14 at its upper side and depending side walls 15, 15, extending in parallelism for the length of the cross bar, so as to produce a channel of uniform width. Outwardly projecting flanges 16, 16, are formed at the lower edges of the vertical walls 15, 15, and extend for the full length of the underside of the latter. As illustrated in Fig. 2, the walls in the central portion of the channel, which portion lies in a horizontal plane, have the greatest height, while the walls extending outwardly of the central section to the ends of the side bar, decrease in height, until the channel disappears, in the merging of the web, walls and flanges into the straight edges 17, 17, at the upturned ends of the cross bar. In such straight edges, the width of the strip 13 is substantially preserved, as will be clear from Fig. 3. By increasing the height of the walls in the central portion of the side bar, the latter is strengthened at points subject to the greatest stresses.

It is a feature of my invention, that I can produce the drawn cross bar without a preliminary blanking operation, to give a suitable contour to the same, in accordance with the previous practice of drawing cross bars. In this manner, all waste of material is avoided. Instead of a blanking operation to produce a contoured cross bar, I absorb the surplus material by forming the walls and flanges of varying height and width, such flanges being narrow in those portions of the cross bar where the walls have the greatest height, and wide in those portions of the cross bar where the walls have the least height. By this operation, I am able to form integral gussets 18 at the ends of the cross bar, which gussets have approximately the full width of the rectangular strip from which the cross bar is drawn. The widened gussets permit a more rigid connection to be effected between the ends of the side bar and the cross bar, by a wider separation in the location of the connecting rivets, and thus stability is added to the frame. In the drawing operation, the ends of the cross bar are bent or upturned, so that the flanges at the ends thereof extend in parallel vertical planes, and as so formed, such upturned ends are adapted to enter the channels of the side bars and abut the vertical webs of the latter, as shown in Fig. 2. This enables me to construct a cross bar having opposite flanges in its lower edge, which extend continuously for the full length of the cross bar, and permits an entirely new method of connection between the ends of the cross bar and the side bars, in that such flanges are connected both to the vertical web of the side bar and to the lower flange of the latter. For this reason, the margin of the wider lower flange of the side bar is deflected so as to lie in the plane of the flanges of the cross bar at their points of contact. Rivets are passed through the vertical flanges of the gussets at the ends of the cross bar and through the web of the side bars, as well as through the flanges of the cross bar and the deflected portions of the lower flanges of the side bar, so as to connect the cross bar to the side bars in a manner which is productive of greatly improved results.

In Fig. 2, the cross bar is shown as curved longitudinally. Such a formation in the drawing operation produces a contraction in the length of the rectangular sheet 13, as will be understood from the diagrammatic view, Fig. 3.

In addition to the structural advantages residing in the improved frame, the formation of the cross bar in the manner shown and described, strengthens the support for the engine, and at the same time effects also a very desirable lowering of the center of gravity of the sprung weight supported upon the running gear of the automobile.

Having thus described my invention, what I claim and desire to secure by Letters Patent of the United States, is:

1. In an automobile frame, two side bars each having a vertical web and an inwardly extending flange, combined with a channel cross bar having upturned ends standing vertically in opposed planes and having flanges at its end portions on each side of the channel, and connections between the flanges of the cross bar and the web and flange of the side bar, at each end of the cross bar.

2. In an automobile frame, two opposed channel side bars, each having a vertical web and an inwardly extending flange the longitudinal margin of which latter stands at an angle to the horizontal plane of the flange, combined with a curved cross bar provided with flanges at its lower side and having upturned ends entered in the channels of the side bars, and connections between the flanges of the cross bar and the web and angular flange of the side bar, at each end of the cross bar.

3. In an automobile frame, two side bars, each having a vertical web and upper and lower inwardly extending flanges and arranged to present opposite channels, in combination with a cross bar curved at its ends and having flanges at its lower side, with the ends of the cross bar entered in the channels of the side bars, and connections between the flanges of the cross bar and the web and lower flange of the side bar, at each end of the cross bar.

4. In an automobile frame, two flanged side bars arranged with their channels opposed for the reception of the ends of a cross bar, in combination with a cross bar depressed at its transverse middle section and upturned at its ends and provided with flanges extending the full length thereof on its under side, and means for securing the flanges at the upturned ends of the cross bar to the web and the lower flange of the side bars.

5. As an article of manufacture, a channel cross bar for a vehicle frame, such bar being depressed in its central section and upturned at its ends to present flanged faces standing in opposed vertical planes, the flanges extending coextensive with the bar at its lower open side, whereby through the said flanges the cross bar may be attached at its ends to the web and lower flange of the side bars of a frame.

6. As an article of manufacture, a cross bar constituted as an inverted channel closed at the top and open at the bottom, with walls depending from the top, and with lateral flanges at the bottom of the walls and extending to the ends of the cross bar, the cross bar being depressed at its middle section and its ends upturned to provide gussets having parallel vertical faces formed by the merging of the top, walls and flanges, whereby, through the said flanges, the ends of the cross bar may be attached to the web and lower flange of the side bars of a frame.

7. As an article of manufacture, a cross bar constituted of a sheet of metal of uniform width, drawn into the form of an inverted channel closed at the top and open at the bottom, with parallel walls of varying height depending from the top, and with flanges of varying width extending outwardly at the bottom of the walls for the full length of the cross bar, the cross bar being depressed at its middle section and having its ends upturned to provide gussets having parallel vertical faces formed by the merging of the top, side walls and flanges of the cross bar, whereby, through the said flanges, the ends of the cross bar may be attached to the web and lower flange of the side bars of a frame.

8. As an article of manufacture, a cross bar constituted of a sheet of metal of uniform width, drawn into the form of an inverted channel having a closed top and an open bottom and depending side walls, with the initial width of the sheet preserved at the ends of the cross bar, and with outwardly extending flanges at the bottom of the walls; the closed top, side walls and channel, merging into the said wider portions at the ends of the cross bar, whereby, such wider portions act to brace the connections of the ends of the cross bar to the side bars of a frame.

9. As an article of manufacture, a cross bar formed from sheet metal and comprising an inverted channel extending substantially the full length of the bar, the central portion of the bar being depressed downwardly and the channel being of varying depth to provide flanges which serve as gussets and which extend in upright opposed planes at each end of the cross bar for attachment to the side bars of an automobile frame.

10. As an article of manufacture, a cross bar formed from sheet metal and comprising an inverted channel extending substantially the full length of the bar, and side strengthening flanges at the lower open side of the channel, said flanges extending the full length of the bar and providing upstanding vertical gussets at each end of the cross bar for attachment to the side bars of an automobile frame, and the central portion of the cross bar being depressed to provide a low center of gravity for the automobile.

In testimony whereof, I have signed my name at Milwaukee, this 30th day of January, 1928.

B. T. ANDREN.